United States Patent [19]
Hans et al.

[11] Patent Number: 5,212,946
[45] Date of Patent: May 25, 1993

[54] RELOADABLE/MODULAR SOLID PROPELLANT ROCKET MOTOR

[75] Inventors: Paul C. Hans, Scottsdale, Ariz.; Gary C. Rosenfield, Las Vegas; Daniel H. Meyer, Henderson, both of Nev.

[73] Assignee: Industrial Solid Propulsion, Las Vegas, Nev.

[21] Appl. No.: 702,511

[22] Filed: May 20, 1991

[51] Int. Cl.[5] .............................................. F02K 9/00
[52] U.S. Cl. ......................................... 60/253; 60/255; 60/256
[58] Field of Search ................. 60/253, 254, 255, 256, 60/234; 102/286, 287, 291

[56] References Cited

U.S. PATENT DOCUMENTS

| | | | |
|---|---|---|---|
| 3,248,873 | 5/1966 | Pase | 60/256 |
| 3,486,330 | 12/1969 | Edman et al. | 60/253 |
| 3,787,013 | 1/1974 | McKenzie, Sr. | 244/155 R |
| 4,493,240 | 1/1985 | Norton | 60/632 |
| 4,574,700 | 3/1986 | Lewis | 60/253 |

FOREIGN PATENT DOCUMENTS 2318306  10/1974  Fed. Rep. of Germany ........ 60/255

Primary Examiner—Richard A. Bertsch
Assistant Examiner—W. J. Wicker
Attorney, Agent, or Firm—Richard R. Mybeck

[57] ABSTRACT

A modular reusable rocket motor combined with reusable, disposable, and expendable assemblies to provide customized operational characteristics for a rocket launched therewith.

18 Claims, 2 Drawing Sheets

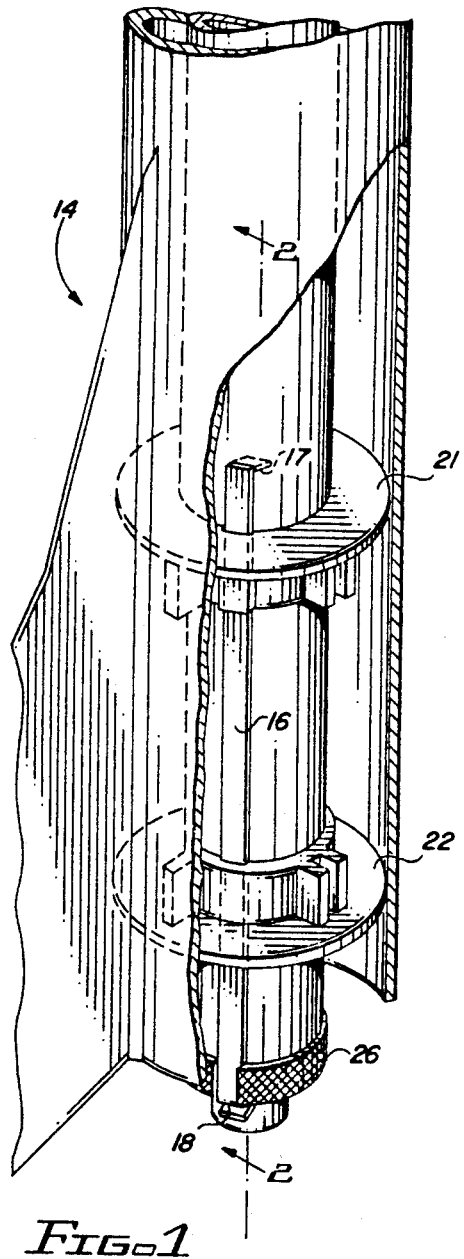
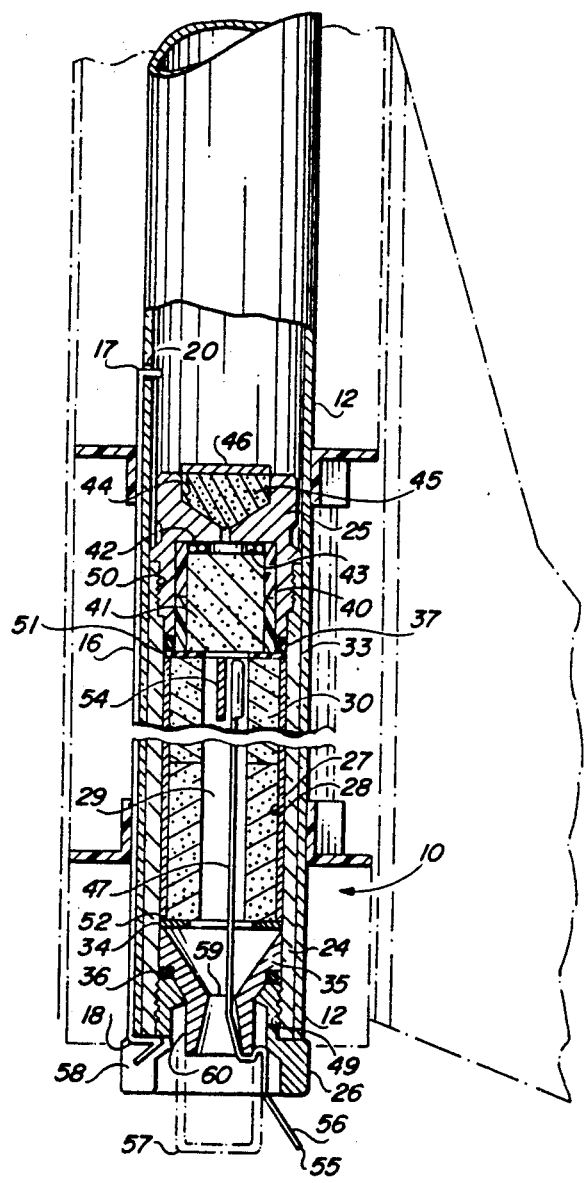
FIG. 1
FIG. 2

RELOADABLE/MODULAR SOLID PROPELLANT ROCKET MOTOR

The present invention relates generally to a modular solid fuel model rocket motor or gas generator and more particularly to such a device which can be assembled, fired, cleaned and reloaded by the user.

BACKGROUND OF THE INVENTION

Generally, cylindrical open-ended housings having a forward and aft closure and a concentric inner liner have heretofore been employed broadly in the production of gas generators and rocket motors.

The prior art has concentrated primarily upon disposable solid fuel rocket motors. However, inherent with such motors are several problems including but not limited to, safety, cost and environmental pollution resulting from the improper disposal of spent motors. Among the prior art means to solve some of these problems and other problems generally associated with the use of solid fuel rocket motors are:

U.S. Pat. No. 2,713,768 which discloses a power gas generating assembly including a rechargeable expendable portion; U.S. Pat. No. 3,144,829 which discloses a solid propellant charge comprising a composite propellant utilizing an organic resin fuel and binder in combination with a solid oxidizer, such as ammonium nitrate, in association with an end cap and igniter assembly for use in jet propelled devices such as missiles, rockets, and the like; U.S. Pat. No. 3,201,933 which discloses a charge for solid propellant rockets in which one cover carries an igniter and a second cover includes a discharge nozzle in combination with a lined housing; and U.S. Pat. No. 3,795,106 which discloses a segmented solid propellant motor having a plurality of radially extending baffles positioned within the solid propellant case to direct the flow of gas therethrough.

However, none of the prior art devices provide a rocket motor which can be reloaded and reused thousands of times nor did any incorporate a modular design which allowed the user to vary the performance of the motor by using interchangeable nozzles of varied design, different length casings, diverse propellant charges and sizes, different ejection charge delays, and different ejection charge power.

Additional problems associated with solid fuel rocket motors not addressed by prior art include those related to providing a "delayed action" ejection charge/assembly, a way to prevent "blow by" of gases around an ejection charge and a way to ship and store both motor and propellant charge without shipping and safety concerns beyond those associated with the handling of "flammable" products.

The present invention is directed to overcoming the deficiencies and limitations of the prior art rocket motors and to enhance rocketry technology by providing a solid propellant rocket motor which is both indefinitely reloadable and which incorporates a basic and unique modular design which enables the operator to vary the performance of the motor within a wide range of parameters to meet any desired result.

BRIEF SUMMARY OF THE INVENTION

The present invention comprises a generally cylindrical open ended housing having forward and aft closures and a cylindrical inner linear disposed therewithin. Inside the housing, propellant grains, contained in suitable cartridges, are arranged symmetrically along the longitudinal axis of the housing and when desired may have a central cavity of various geometrical shapes defined therethrough. The cartridges are held in position by the coaction of the end closures and the forward and aft washers with the housing and the liner. The washers are each held in place by O-rings which are inserted into the housing and secured by the corresponding forward or aft closure. When desired, an ejection mechanism comprising a time delay element, a delay insulator, a delay O-ring, and a suitable charge are placed forward of the forward washer and secured in place by the coaction of the forward closure, a suitable cap, and the housing. When properly assembled, as in the preferred embodiment hereinafter described, the present invention is mountable within the motor tube of a rocket and will provide the rocket the motive power for launch as well as provide a means for delayed action recovery system or capsule ejection.

The present invention can be assembled in different ways in order to mix and match its varied features. Its design provides for a seal made of an elastomeric material and O-rings which during engine firing, prevents rocket propellant combustion gases from leaking from the forward end of the motor, and protects the ejection charge from premature ignition which could otherwise occur should the propellant combustion exhaust gases be permitted to leak to the ejection charge and ignite that charge before its proper time. A similar seal, disposed between the nozzle and the aft end of the cylindrical housing, coacts with the seal at the forward or ejection charge end of the cylindrical housing to provide higher pressure, that is, from about 800 psi up to about 1000 psi, higher performance, and more consistent pressures than previously attainable with prior art motors of the hobby type.

Accordingly, a principle object of the present invention is to provide a new and improved reloadable modular solid propellant rocket motor including means and methods for reloading both time delay and ejection charge units therewithin.

Another object of the present invention is to provide a new and improved rocket motor in which specially formulated and designed time delay material coacts with an O-ring in sealing engagement therewith to prevent the propellant combustion exhaust gases from leaking from the forward end of the motor and around the ejection charge time delay thereby preventing the premature ignition of the ejection charge and the escape of combustion gases.

A further object is to provide a rocket motor which enables the user to substantially reduce the cost per flight and place the pleasure of rocketry within the reach of more moderate incomes.

Still another object of the present invention is to provide a novel and unique rocket motor system which by virtue of its modular design enables the incremental parts thereof to be shipped in interstate commerce without incurring the rigors or the expense required by the Postal Service or other shipping services when such shipments include explosives.

A still further object of the present invention is to provide a method and apparatus that can be used as a modular solid fuel rocket motor having recovery or capsule ejection means which can be assembled, fired, cleaned and reloaded by the user and to provide satisfactory, unique solutions to the prior art problems related to solid fuel rocket motor design.

Still another object of the present invention is to provide a new and improved rocket motor which enables the operator thereof to mix and match a variety of propellants, delays, ejection charges and nozzles of diverse types to achieve various performance characteristics.

These and still further objects as shall hereinafter appear are readily fulfilled by the present invention in a remarkable unexpected manner, as will be readily discerned from the following detailed description of an exemplary embodiment thereof, especially when read in conjunction with the accompanying drawings in which like parts bear indicia throughout the several views.

BRIEF DESCRIPTION OF THE DRAWINGS

In the drawing:

FIG. 1 is a fragmented side view of a rocket and motor tube into which a rocket motor embodying the present invention has been installed;

FIG. 2 is a cross-section taken on line 2—2 of FIG. 1; and

DESCRIPTION OF THE PREFERRED EMBODIMENTS

Figure 3:
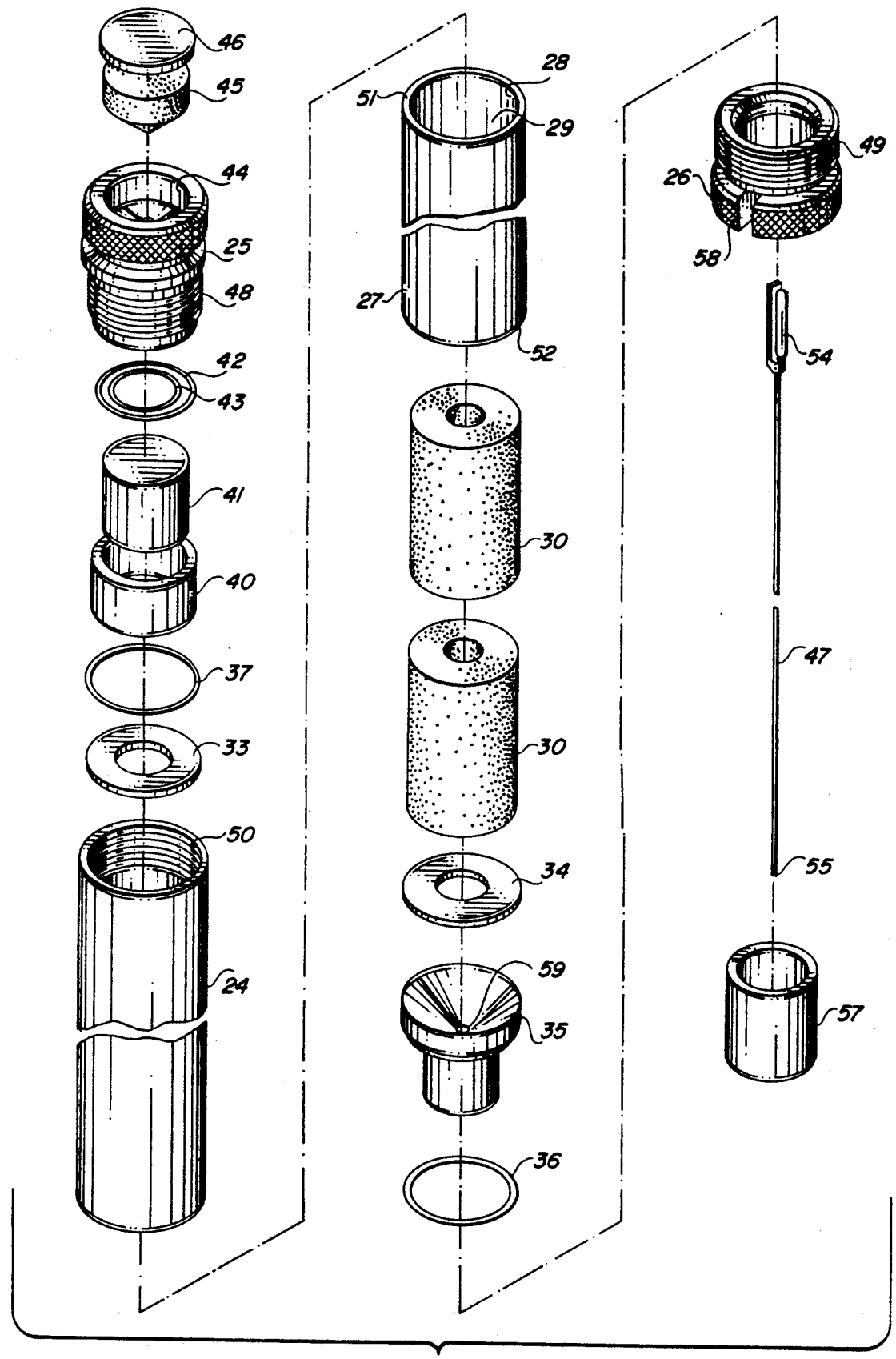
FIG. 3 is an exploded view of a rocket motor embodying the present invention.

The rocket motor embodying the present invention is identified by the general reference 10. As shown in FIGS. 1 and 2, motor 10 is mounted telescopically into the motor tube 12 of a rocket 14 and is secured therein by the coaction of a resilient motor hook 16 having a first bent portion 17 and the upper end thereof a second bent portion 18 at the lower end thereof. Hooked portion 17 at the upper end thereof passes through motor tube 12 at an aperture 20 defined therein while bent portion 18 is adapted to engage rocket motor 10 when operatively installed as will be hereinafter described. Motor hook 16 is secured to motor tube 12 in surface-to-surface engagement therewith by the coaction of an upper restraining ring 21 and a lower restraining ring 22 disposed in circumscribing relationship about motor tube 12.

Referring to FIG. 3, each motor 10 comprises of a generally cylindrical open ended housing 24 having a forward closure 25, and an aft closure 26. Inside housing 24, a cylindrical liner 27 is disposed to provide a removable inner surface therefor and to define a cartridge chamber 29 therein for receiving and encasing one or more suitable propellant grain cartridges which may be annular cartridges 30 (as shown) or solid cylindrical cartridges (not shown) which are disposed in axial relationship in chamber 29 along the longitudinal axis of housing 24. In a preferred practice, each cartridge 30 has a central bore 31 defined therethrough for a purpose to be hereinafter explained. Cartridges 30 are secured in place by a coaction of a forward insulator washer 33 and an aft insulator washer 34. The aft washer 34 and nozzle 35 are held in place by a suitable sealing member such as O-ring 36 which is inserted into housing 24 around nozzle 35 and secured in place by the locking engagement of aft closure 26 into housing 24.

In a similar fashion, forward washer 33 is held in place within housing by the of insertion of suitable sealing member 37 such as O-ring 37 and the positioning of annular delay insulator 40 in abutting relationship therewith. A cylindrical time delay element 41 is inserted into for nesting engagement in time delay insulator 40. A pair of concentric O-rings 42, 43 forming a delay seal are then deployed onto the exposed end surface of time delay element 41 and forward closure 25 is then screwed or otherwise fastened into housing 24 for detachable locking engagement therewith.

As shown more particularly in FIG. 3, forward closure 25 has an ejection charge well 44 defined therein for receiving and holding a suitable ejection charge material 45 therewithin. An ejection charge plastic, paper or foil end cap 46 is disposed over and covers the ejection charge 45 to prevent its accidental removal from within forward closure 25.

In a preferred practice of the present invention, rocket motor 10 comprises a combination of reusable, disposable and expendable parts. For example, cylindrical housing 24, forward closure 25, aft closure 26 and some nozzles 35 are reusable. Those parts which are disposable are liner 27; sealing members 36, 37; forward and aft insulator washers 33, 34; delay insulator 40; time delay element 41; igniter 47; nozzle 35; and ejection charge cap 46. Expendable parts that is, those which are consumable, are the propellant grain cartridges 30; elastomeric time delay element 41 and ejection charge 45.

In one practice of the present invention it is found advantageous to apply a light coat of suitable heat-tolerant grease such as silicone grease to the threads 48 formed on the forward closure 25, to the threads 49 on aft closure 26, to the outer surface of sealing members 36, 37 and to the complimentary threads 50 formed within both ends of the cylindrical housing 24.

To assemble rocket motor 10, liner 27 is telescopically inserted into housing 24 and insulator washer 33 is introduced into housing 24 to lay upon the leading edge 51 of liner 27. Next O-ring 37 is placed in circumscription about delay insulator 40 and this assemblage is passed axially into housing 24 until it engages forward insulator washer 33. As previously explained, delay insulator 40 defines a center chamber into which time delay element 41 is telescopically inserted until it abuts washer 33. Concentric delay O-rings 42, 43 are then placed upon the time delay element 41 and forward closure 25 is then screwed into housing 24 by rotatably engaging threads 49 with threads 50 until secure.

A suitable ejection charge 45 such as black powder, is loaded into ejection charge well 44 in forward closure 25 to a level approximately equal to ¾ of its volume and sealed with end cap 46.

The housing 24 is then inverted to complete the assemblage in the following fashion. One or more cartridges 30 are placed into the chamber 29 defined by liner 27 until the lead cartridge 30 engages insulator washer 33. When chamber 29 is filled with the desired number of cartridges 30, aft insulation washer 34 is inserted into housing 24 until it engages the trailing edge 52 of liner 27. Next sealing member 36 is disposed about nozzle member 35 and that assemblage is telescopically inserted into housing 24 until nozzle 35 engages insulator washer 34. Aft closure 26 is then screwed into place. Igniter 47 is then inserted axially into a central opening defined by closure 26, nozzle 35, washer 34 and, when annular cartridges are used, cartridges 30 until the coated end 54 thereof lies in operative proximity to time delay element 41 adjacent the lead edge of cartridge 30 and the free end 55 of igniter 47 is then folded across aft closure 26 to extend outwardly therefrom to form an electrical connector portion 56. Nozzle cap 57 is then telescopically inserted onto nozzle 35 and secures igniter 47 against axial movement relative thereto. Motor 10 is secured in place in motor tube 12 by the insertion of spring biased bend 18 of motor hook 16 into a slot 58 defined aft closure 26 as shown in FIGS. 2 and 3. Slot 58 further allows the use of a longer housing 24 for a given length of motor hook 16 thereby allowing use of a longer propellant cartridge 30 because it secures the rocket motor 10 and the aft end of the housing 24 instead of the aft end of the aft closure 26 during operation. The novel coaction between motor hook 16 and aft closure 26, and more particularly between lower bend 18 and slot 58 as defined, also greatly enhances both the safety of the rocket motor 10 and its security.

Once assembled, the present invention may be installed in a model rocket device in the same manner as commonly employed for fully disposable solid propellant motors such as clips, tape or clips in combination with tape. As assembled, aft closure 26 serves as a stop against the end of rocket motor tube 12 which prevents motor 10 from moving up into tube 12 in response to the thrust of the operating motor. The rocket is then mounted on its launch pad and fired by applying electrical power to the wire connector end 56 of igniter unit 47. This ignites the propellant grains 30 within housing 24. High temperature, high pressure propellant gasses are forced out of housing 24 through nozzle 35 providing thrust for the rocket to ascend. Also, while the propellant is burning, the elastomeric time delay element 41 coacts under the attendant heat and pressure with delay sealing member 37 and concentric O-ring 42, 43 to form a synergistic seal therebetween which prevents propellant combustion exhaust gases from reaching and/or leaking around the time delay element 41. This sealing coaction prevents the premature ignition of the pyrotechnic ejection charge 45 and prevents combustion gases from escaping out of motor 10 through the juncture between forward closure 25 and housing 24. After the delay period, obtained by forming time delay element out of under oxidized fuel rich propellant, the ejection charge 45 is ignited and will blow the rocket recovery system or capsule out of the rocket. While the propellant is burning, nozzle 35, aft closure 26 and housing 24 coact with sealing member 36 to create a seal which prevents propellant exhaust gases from escaping the aft end of the motor 10 through juncture between aft closure 26, housing 24 and nozzle 35 and forces the exhaust gases through the central opening 59 in nozzle 35.

Upon recovery and cooling of the rocket, motor 10 can be removed from the rocket, disassembled, cleaned and reused.

While a number of suitable materials are commercially available for the fabrication of rocket motor 10, particularly satisfactory results are obtained when housing 24 is fabricated from a light weight, ductile, high strength, heat resistant metal such as magnesium, titanium or aluminum. In one practice, a ductile aluminum such as the ductile aluminum supplied by Alcoa as ALUMINUM 6061 provided excellent results. Both forward closure 25 and aft closure 26 can be made of the same metal.

Motor hook 16 can be made from spring steel or from a conventional thermal resistant resilient plastic. The nozzle 35 is precast or injection molded using a thermoset plastic, a glass reinforced phenolic resin, graphite, or mixture of resin and graphite to obtain satisfactory results. Nozzle 35 is especially designed so that if an untoward pressure occurs, that is, a pressure in excess of 2000 psi, nozzle 35 will fracture and enlarge the exhaust to facilitate the venting of the excess pressure through the enlarged opening 60 in aft closure 26.

The several O-rings used throughout namely, O-rings 36, 37, 42, and 43 are standard elastomeric O-rings. Insulator washers 33, 34 are preferably made from impregnated fiber board reinforced plastic while liner 27 is preferably formed of either an insulative cardboard, a phenolic material or a vulcanized fiber.

Time delay element 41 is formed of a composite elastomeric substance containing an underoxidized fuel rich propellant having sufficient inhibitor such as rubber binder admixed therein to achieve the desired igniter delay. Metallic fuels such as tin or aluminum can be mixed with an excess of rubber binder and give quite satisfactory results.

A suitable rocket propellant for use herewith contains about 82 percent (w/w) of a suitable oxidizer such as ammonium perchlorate, with or without a metallic powder, and 18 percent of a synthetic rubber such as hydroxy-terminated polybutadiene; black powder; and like propellants.

In practice, the pyrotechnic coating 54 on igniter 47 contains an oxidizer/fuel mixture containing ammonium or potassium perchlorate, metal powder and a binder selected from the group consisting of cellulose acetate, nitrocellulose, two-component epoxy, and urethanes.

In certain launchings, the propellant charge required to achieve the preselected flight pattern will not require cartridge chamber 29 to be filled with cartridges 30. In such cases, one or more cartridges 30 may be replaced by empty inert spacer tubes (not shown) formed of cardboard or the like and conforming in shape to cartridge 30.

It should also be noted that rocket motor 10, as herein described and illustrated allows a wide range of performance by the simple expedient of selecting cartridges 30 of different power ratings for insertion into cartridge chamber 29.

As shown in the drawing, aft closure 26 has an outside diameter which is larger than the diameter of motor tube 12 and coacts therewith to prevent rocket motor 10 from advancing axially upwardly into the tube 12 during use. As previously described, the coaction of motor hook 16 with aft closure 26, and especially slot 58 formed therein, prevents the rocket motor 10 from axially exiting the motor tube 12, as well.

Another important feature of the design of aft closure 26 arises out of safety release provided by the use of a frangible nozzle 35 designed to break away at the neck thereof when internal pressure exceed a pre-selected level, for instance 2000 psi, and allow the exhaust to be vented into enlarged opening 60 provided by aft closure 26 around the lower protrusion of the unfractured nozzle 35. Various break pressures can be obtained by varying the material from which nozzle 35 is fabricated suitable nozzle material includes silicate ceramics, graphite and the like.

It is of course understood that known functionally equivalent materials may be substituted for the materials recited herein without changing the nature or utility of the invention.

From the foregoing, it becomes apparent that a new and useful rocker motor has been herein described and illustrated which fulfill all of the aforestated objectives in a unique fashion. It is of course understood that such modifications, alterations, and adaptations as may readily occur to an artisan having ordinary skills to which this invention pertains are intended within the spirit of the present invention which is limited only by the scope of the claims appended hereto.

Accordingly what is claimed is:

1. A modular rocket motor comprising a cylindrical housing having a first and second open end, forward component retainer means, aft component retainer means, each said component retainer means being detachably secured into a different end of said cylindrical housing in non-bonded relationship thereto and coacting therewith to define a chamber therebetween; seal means dividing said chamber into a first and second compartment; a time delay element operatively disposed in said first compartment; a propulsion charge operatively disposed in said second compartment; nozzle means disposed in said second compartment in operative interposition between said propulsion charge and said aft retainer means and including a central opening extending axially therethrough for directing combustion gases from said second compartment when said propulsion charge is ignited to and through said aft retainer means while said seal means coacts with said time delay element to prevent said combustion gases from engaging said forward retainer means.

2. A modular rocket according to claim 1 in which said forward component retainer means has a capped ejection charge well defined therein.

3. A rocket motor according to claim 2 in which an ejection charge is disposed in said ejection charge well and secured therein.

4. A rocket motor according to claim 1 in which an insulating cylindrical liner is telescopically disposed within said housing in free-moving relationship thereto, said liner having a distal end and proximal end.

5. A rocket motor according to claim 4 which a first insulator washer is operatively disposed in abutting relationship to said distal end of said liner and a second insulator washer is disposed in abutting relationship with said proximal end of said liner.

6. A rocker motor according to claim 5 in which an annular delay insulator is seated upon said first insulator washer in said first compartment and a sealing member is circumscribed about said delay insulator in operative engagement with said housing to prevent the passage of said combustion gases therebetween.

7. A rocket motor according to claim 1 in which an O-ring circumscribes said nozzle means and causes said combustion gases to flow only through said central opening.

8. A rocket motor according to claim 1 in which said propulsion charge is cylindrical.

9. A rocket motor according to claim 8 in which said cylindrical propulsion charge has an opening extending axially therethrough for receiving an elongated igniter therewithin.

10. A rocket motor according to claim 9 in which said opening extends on the longitudinal axis of said charge.

11. A rocket motor according to claim 1 having an inert spacer disposed upon sid propulsion charge to fill said second compartment.

12. A rocket motor according to claim 1 in which sid nozzle means is frangible at a preselected pressure to enlarge said central opening when said second compartment achieves said pressure.

13. A rocket motor according to claim 1 in which said aft component retaining means has slot means defined therein for cooperative coaction with a rocket motor retaining hook mounted to the rocket structure, said hook coating with said slot to prevent said motor from being ejected from said rocket structure.

14. A rocket motor comprising a reusable cylindrical housing having a first and second open end, forward component retainer means, aft component retainer means, each said retainer means being reusable, detachably secured into a different end of said cylindrical housing and coating therewith to define a chamber therebetween; seal means dividing said chamber into a first and second compartment; a time delay element operatively disposed in said first compartment; a propulsion charge operatively disposed in said second compartment; nozzle means disposed in said second compartment in operative interposition between said propulsion charge and said aft retainer means and including a central opening extending axially therethrough for directing combustion gases from second compartment when said propulsion charge is ignited to and through said aft retainer means while said seal means coacts with said time delay element to prevent said combustion gases from engaging said forward component retainer means; said forward component retainer means having an ejection charge well defined therein; an ejection charge disposed in said ejection charge well and secured therewithin; an insulative cylindrical linear telescopically disposed within said housing in free-moving relationship thereto, said liner having a distal end and a proximal end; a first insulator washer operatively disposed in abutting relationship to said distal end of said liner and a second insulator washer is disposed in abutting relationship with said proximal end of said linear; an annular delay insulator seated upon said first insulator washer in said first compartment; a sealing member circumscribed about said delay insulator in operative engagement with said housing to prevent the passage of said combustion gases therebetween; an O-ring circumscribing said nozzle means and directing said combustion gases to flow only through said central opening; an inert spacer disposed upon said propulsion charge to fill said second compartment; said nozzle means being fragile at a preselected pressure to enlarge said central opening when said second compartment achieves said pressure; and an inert spacer disposed upon said propulsion charge to fill said second compartment.

15. A rocket motor according to claim 14 in which said cylindrical propulsion charge has an opening extending axially therethrough for receiving an elongated igniter therewithin.

16. A rocket motor according to claim 15 in which said opening extends on the longitudinal axis of said charge.

17. A rocket motor according to claim 16 in which an ejection charge is disposed in said ejection charge well and secured therein.

18. A rocket motor according to claim 1 in which said aft component retaining means has a diameter greater than the diameter of said housing and prevents said rocket motor from moving into the rocket structure.

* * * * *